United States Patent [19]

Petterson et al.

[11] Patent Number: 5,393,105
[45] Date of Patent: Feb. 28, 1995

[54] DUCTWORK FOR DELIVERY OF LOW TEMPERATURE AIR

[76] Inventors: Bart Petterson, #5 Triad Center, Suite 750, Salt Lake City, Utah 84180; James Cherrington, 195 Matterhorn Dr., Park City, Utah 84060; Michael Cherrington, 4770 Ichabod Pl., Salt Lake City, Utah 84117; Garry Rose, 1753 Vineyard, St. Helena, Calif. 94574

[21] Appl. No.: 996,654

[22] Filed: Dec. 24, 1992

[51] Int. Cl.$^6$ .............................................. F16L 11/12
[52] U.S. Cl. ................................ 285/47; 285/915; 138/153; 138/170; 138/128
[58] Field of Search ............... 138/153, 154, 170, 149, 138/128, 129; 285/47, 370, 397, 915

[56] References Cited

U.S. PATENT DOCUMENTS

| | | | |
|---|---|---|---|
| 2,145,839 | 1/1939 | Sherman et al. | 138/128 X |
| 2,319,802 | 5/1943 | Dreyfuss | 138/153 |
| 2,784,129 | 3/1957 | Stephens | 138/128 X |
| 2,980,568 | 4/1961 | Kazmierowiez | 285/47 X |
| 3,314,449 | 4/1967 | Krone et al. | 138/153 X |
| 3,406,993 | 10/1968 | Haynes | 285/397 X |
| 3,642,034 | 2/1972 | Ullman et al. | 138/129 X |
| 3,847,693 | 11/1974 | Ghersa et al. | 138/149 X |
| 4,181,157 | 1/1980 | De Camp | 138/128 X |
| 4,205,105 | 5/1980 | Blundell | 138/128 X |
| 4,208,373 | 6/1980 | Matovich | 138/149 X |
| 4,239,064 | 12/1980 | Gilman | 138/129 X |
| 4,351,365 | 9/1982 | Bauermeister et al. | 138/149 |
| 4,421,202 | 12/1983 | Hoy | 138/149 X |
| 4,462,556 | 7/1984 | Graham, Jr. | 138/129 X |
| 4,576,206 | 3/1986 | Lauren | 138/149 |
| 4,713,271 | 12/1987 | Searl et al. | 138/149 X |
| 4,719,945 | 1/1988 | Richards et al. | 138/129 X |
| 4,857,371 | 8/1989 | McClintock | 138/149 X |
| 4,890,864 | 1/1990 | Anderson et al. | 285/47 X |
| 4,972,759 | 11/1990 | Nelson | 138/149 X |
| 5,056,564 | 10/1991 | Roth | 138/149 |
| 5,099,889 | 3/1992 | Ratzlaff | 138/128 X |
| 5,218,170 | 6/1993 | Ferlier et al. | 138/129 X |

FOREIGN PATENT DOCUMENTS

| | | | |
|---|---|---|---|
| 0482680 | 8/1929 | Germany | 138/149 |
| 0393467 | 6/1933 | United Kingdom | 285/397 |

OTHER PUBLICATIONS

Military Standardization Handbook-Plastics pp. 43-4-4-on polyethylenes.

Primary Examiner—Randolph A. Reese
Assistant Examiner—Heather Chun Shackelford
Attorney, Agent, or Firm—Thorpe, North & Western

[57] ABSTRACT

A duct device for insulated delivery of temperature controlled air. The device comprises an elongated, tubular member configured as a conduit for delivery of air and having a tubular wall fabricated of non-load-bearing insulative material. This insulated material includes at least one continuous gap formed into the tubular wall and extending along the tubular member. This gap is filled with a rigid binder which bonds to the insulative material and is capable of reinforcing the structural strength of the tubular member. This binder filled gap operates as a strut, which may be positioned longitudinally along the tubular member, or in other patterns such as a helical configuration. Reinforcing structure is also disclosed for the end sections of the tubular member, along with interconnecting structure.

19 Claims, 2 Drawing Sheets

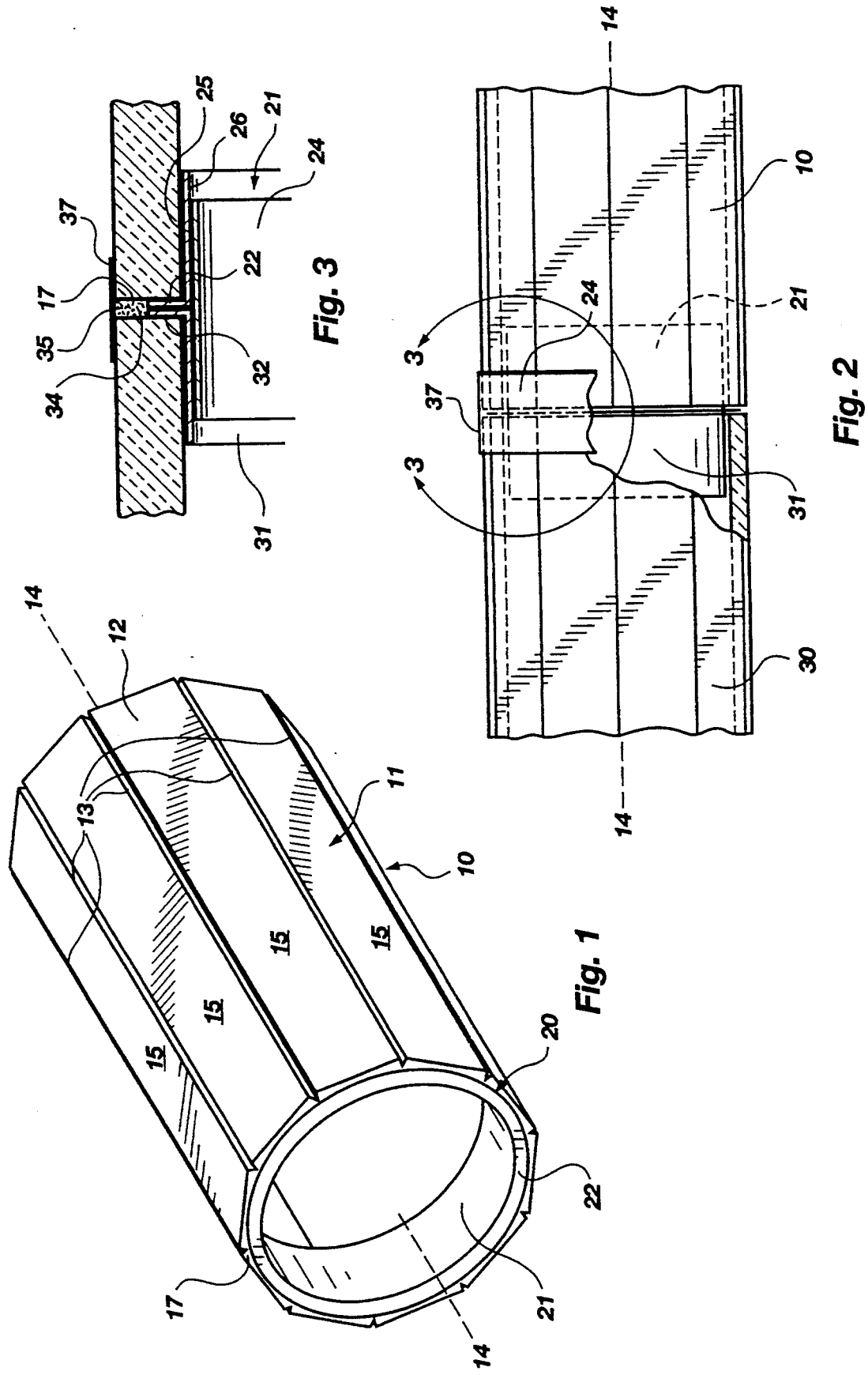

DUCTWORK FOR DELIVERY OF LOW TEMPERATURE AIR

BACKGROUND OF THE INVENTION

1. Field of the Invention

This invention relates to ductwork for ventilation systems which supply temperature controlled air to an enclosed room. More particularly, the present invention pertains to low temperature ductwork for commercial structures.

2. Prior Art

With the development of low temperature delivery systems for commercial applications, new demands are being imposed on existing ductwork. Whereas traditional refrigeration units cooled the air to a chilled condition which required movement of substantial volumes of air through a room to maintain cool temperatures, newer systems are supplying super-cooled air which cools the room with less air movement. By reducing the air temperature at the cooling coils to near freezing, less air is required to cool a room. This permits the use of less power and lower capacity systems. These and other factors translate into substantial cost savings for air conditioning services.

In order to maintain the efficiency of such low temperature delivery systems, enhanced insulation is required on the ductwork. Typically, fiberglass is wrapped around the duct at sufficient thickness to produce the desired R- factor. A problem arises at joints where leaks of cold air occur. Such leaks result in condensation and erosion of the fiberglass, thereby damaging the insulation material adjacent to the leak. This then increases formation of condensation and temperature loss, further extending the damage to the ductwork and insulative shield.

Improved ductwork with higher quality interconnection components, refined attachment of insulation and enhanced materials selection is able to solve the problem; however, the cost of these improvements makes the cost savings for the low temperature system less appealing. This is particularly true where construction of prior art ventilation systems involve ductwork that constitutes little more than a cheap aluminum tube with a layer of fiberglass batting wrapped around it. Although long term energy savings dwarf the initial savings realized with the installation of a low cost air delivery system, competition for construction will favor the lower capital cost. Indeed, a lower initial construction cost can mean the difference between a contractor winning a bid and losing the total construction package. Contractor will therefore tend to cut costs by installing inexpensive ductwork.

What is needed is a low temperature air delivery system that does not involve use of expensive ductwork, yet does not compromise the effective and complete insulation required.

OBJECTS AND SUMMARY OF THE INVENTION

It is therefore an object of the present invention to provide improved ductwork that is inexpensive, but offers a full quality of insulation and system integrity.

It is a further object of this invention to provide ductwork made of conventional inexpensive materials which offer enhanced structural durability and long term service.

Yet another object of this invention is the provision of ductwork components which can be quickly and inexpensively assembled in a manner similar to conventional methods, yet offer increased R-factor, control of leakage and low cost construction.

These and other objects are realized in a duct device for insulated delivery of temperature controlled air flow which includes an elongated, tubular member configured as a conduit wherein the tubular member has a tubular wall fabricated of non-load-bearing insulative material. This tubular wall also incorporates a plurality of longitudinal cuts forming open, elongate gaps extending substantially parallel with a central axis of the tubular wall. These gaps project into the insulative material from a surface of the tubular wall and provide means for placement of a rigid binder solidified and bonded within the gap to the insulative material. The resulting rigid binder provides structural stiffness both radially and axially to the duct device.

An additional aspect of the invention is represented by a duct device for insulated delivery of temperature controlled air flow wherein the elongated, tubular member configured as a conduit for deliver of air and tubular wall include at least one continuous gap formed into the tubular wall and extending along the tubular member. This gap is similarly filled with a rigid binder which bonds to the insulative material and is capable of reinforcing the structural strength of the tubular member.

Finally, a method of preparing such a duct system is disclosed, which involves the steps of (1) forming a continuous gap into and along a substantial length of the insulative material; and 2) filling the gap with liquid binder which bonds with the insulative material and solidifies into a rigid, structurally reinforcing member.

These and other objects will be apparent to those skilled in the art, in view of the following detailed description, taken in combination with the accompanying drawings.

DESCRIPTION OF DRAWINGS

FIG. 1 shows a perspective view of a section of duct embodying the present invention.

FIG. 2 depicts a side view of a section of duct including coupling structure.

FIG. 3 illustrates a sectional cross-section of the duct taken along the 3—3 of FIG. 2.

DETAILED DESCRIPTION OF THE INVENTION

Figure 4:
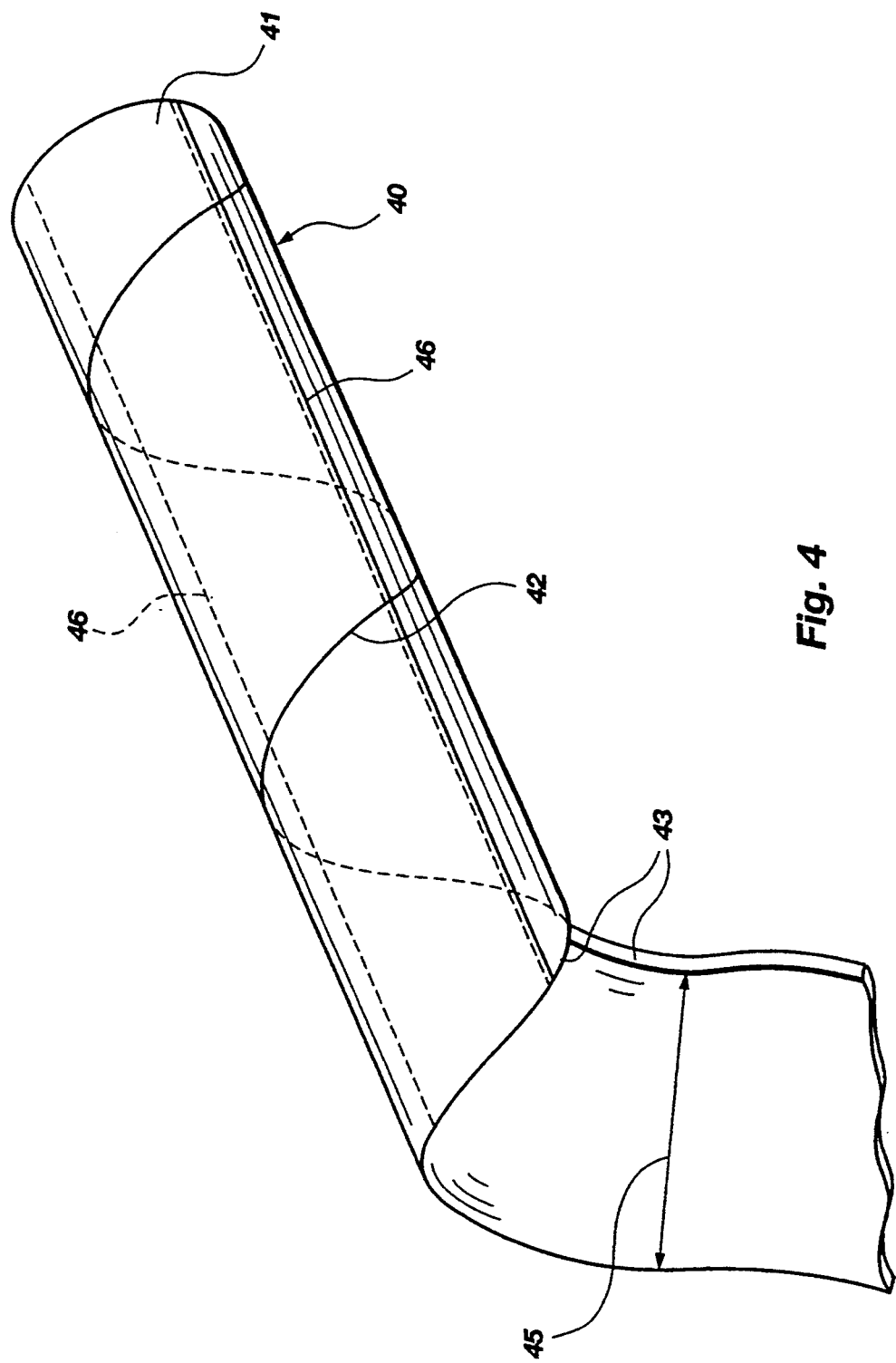
FIG. 4 discloses an additional embodiment of the present invention.

Referring now to the drawings:

A preferred embodiment of a duct device 10 in accordance with the subject invention is illustrated. This duct incorporates conventional insulation material previously used as ductwork, but not having sufficient strength to be load bearing. This ductwork was a tubular conduit having an insulation wall which provided a temperature barrier. The prior art insulated ductwork, however, would collapse if weight were applied either radially or axially. Therefore, care was required to make sure that the ductwork was supported and isolated from any load-bearing objects. The present invention is capable of bearing significant loads without collapsing, even though it is made of the same insulation material as previously applied.

The preferred duct device comprises an elongated, tubular member 11 which is configured as a conduit to facilitate delivery of air to a diffuser or some other component of an air circulation system. The dimensions and general configuration of the conduit corresponds to the dimensions and size of conventional low temperature conduit comprised of similar insulation material. Although the subject tubular member is referenced in combination with other components of an air circulation system, it is to be understood that its use is not so limited.

The tubular member 11 includes a tubular wall 12 fabricated of non-load-bearing insulative material such as fiberglass, rock wool, Thinsulate(TM) foamed polymer, or other known insulative products. This tubular wall 12 has a plurality of longitudinal cuts 13 forming open, elongate gaps extending substantially parallel with a central axis 14 of the tubular wall. These gaps are shown projecting into the insulative material from an exterior surface of the tubular wall; however, they may likewise be formed from the inside. An advantage of the using an exterior gap is the formation of a polygon structure with respective sides 15 of the polygon formed between the respective gaps 13. With the gaps formed at the internal surface, the conduit would form a more circular configuration.

The gaps may be formed by numerous techniques, depending upon the type of insulative material being used. As has been suggested, one method involves making a longitudinal cuts down a length of the tubular member 11. Because of the circular configuration of the tubular member, stress released from the cut forms a triangular gap having an acute angle positioned within the insulative material, which diverges outward to the surface. This release of stress tends to allow the insulative material to flatten in response to elastic memory and return to a naturally occurring flat, biased configuration.

Consequently, the tubular member assumes a polygonal shape. Although the polygon cross-section of FIG. 1 is a decagon, other geometries are contemplated. For example, a preferred range of sides for the cross-section includes eight to twelve sides. Obviously, this will depend on the diameter of the tubular member, as well as the modulus and elasticity of the insulative material. The decagon configuration is suitable for conventional fiberglass material typically applied as ductwork in these systems. Depending upon the type of insulation material being used, tubular members down to four sides may be developed. It will be apparent to those skilled in the art that insulative material having greater structural stiffness will be required where fewer reinforcing gaps are provided.

In the absence of resiliency to spread the cut to form a gap, the gap could be cut to its actual dimension. Hereagain, the absence of restoring elastic forces would retain the circular configuration, or whatever shape the tubular member had prior to emplacement of the gap structure. This circular configuration can also be generated by increasing the number of gaps spaced around the tubular member such that the multisided cross-section approaches a circular shape.

Returning to the preferred embodiment shown in FIG. 1, each gap 13 is filled with a rigid binder which is solidified and bonded within the gap to the insulative material to provide structural stiffness both radially and axially to the duct device. Where the material comprises fiberglass, the binder flows into the exposed fibers and mechanically bonds to form a rigid strut extending along the length of the tubular member. Therefore, each gap 13 shown in FIG. 1 becomes a reinforcing strut which stabilizes the shape, despite application of weight over the duct, or twisting required to position the duct around corners as part of a ductwork system.

This structure and device permits the conversion of an otherwise flimsy length of existing tubular ductwork into a stiff structure without incurring major expense or losing the insulating character of the product. Similarly, a flat sheet of insulative material can be converted to tubular ductwork by forming a junction of two opposing sides of the sheet of insulative material to form the tubular wall. This junction would likewise include a gap which is filled with the rigid binder to provide structural stiffness into that section of the tubular wall. Additional cuts and gaps can be formed around the remaining surface to further enhance the stiffness of the tubular member.

The tubular member may be further strengthened by inserting an end reinforcing member 20 comprising a sleeve 21 configured to slide snugly into an end opening of the tubular member. This sleeve 21 includes a radial flange 22 extending outward from the sleeve to form a right angle which seats against an end face 17 of the tubular member. The end reinforcing member 20 is bonded or otherwise fixed in place at an internal, contacting face 22 and at the end face 17 of the tubular member to strengthen the tubular member at the end opening thereof. Typically, the reinforcing member is fabricated of rigid metal material.

In addition to providing reinforcement to the tubular member, the reinforcing member 20 enables use of an interconnect sleeve 24 to interlock two tubular members 10 and 30 in alignment 14. The interconnect sleeve 24 has an outer wall 25 configuration similar to an inner wall 26 configuration of the reinforcing member and is sized to provide a secure frictional fit of the reinforcing members of two tubular devices around a single interconnect sleeve. This enables intercoupling of two tubes along a common axis 14 in an inexpensive manner. This is illustrated in FIG. 2.

With the two tubular members 10 and 30 interconnected, the respective reinforcing members 21 and 31 abut at their respective flange members 22 and 32. Glue or other binder 34 is solidified within a separation space 35 around a periphery of the radial flanges 22 and 32 to develop an air-tight seal to prevent escape of air from within the tubular device. This cooperates with the sleeve 24 to seal and anchor the respective tubular members in place. An outer ring of tape 37 conceals the joint, protects the binder from exposure to the elements, and provides a pressure barrier continuation of the outer skin of the ductwork.

The tubular member 40 can also be formed of insulative material 41 which is configured in a spiral or helical form as shown in FIG. 4. Again, the tubular member includes at least one continuous gap 42 formed into the tubular wall and extending along the tubular member. This gap is filled with a rigid binder which bonds to edges 43 of the insulative material and is thereby capable of reinforcing the structural strength of the tubular member. In this instance, the width 45 of the material determines the spacial separation of the reinforcing strut or gap 42, and the general stiffness of the tubular member. Addition gaps 46 can be formed by cutting into the tubular member in accordance with the methodology set forth above.

These procedures are generally represented by a method for structurally reinforcing a tubular member comprised of non-load-bearing insulative material, wherein the steps include: a) forming a continuous gap into and along a substantial length of the insulative material; and b) filling the gap with liquid binder which bonds with the insulative material and solidifies into a rigid, structurally reinforcing member.

It will be apparent to those skilled in the art that other structural configurations of the present invention are feasible by applying the subject method steps in accordance with the inventive concepts as hereafter claimed. Accordingly, it is to be understood that the foregoing embodiments are given by way of example, and are not to be deemed limiting.

We claim:

1. A duct device for insulated delivery of temperature controlled air flow, said device comprising:
   an elongated, tubular member configured as a conduit for deliver of air, said tubular member having a tubular wall fabricated of non-load-bearing insulative material;
   said tubular wall having a plurality of longitudinal cuts forming open, elongate gaps extending substantially parallel with a central axis of the tubular wall and projecting into the insulative material from a surface of the tubular wall; and
   a rigid binder solidified and bonded within the gap to the insulative material to provide structural stiffness both radially and axially to the duct device;
   wherein the tubular member is formed from a sheet of insulative material which is joined at a junction of two opposing sides of the sheet of insulative material to form the tubular wall, said junction including a gap which is filled with the rigid binder to provide structural stiffness into the tubular wall.

2. A device as defined in claim 1, wherein the insulative material comprises fiberglass.

3. A device as defined in claim 1, comprising at least four gaps equidistantly spaced around the tubular member and filled with rigid binder.

4. A device as defined in claim 1, comprising at least ten gaps equidistantly spaced around the tubular member and filled with rigid binder to increase the radial and axial load-bearing capacity of the tubular member.

5. A device as defined in claim 1, wherein each gap is formed as an acute angle cut into an exterior surface of the tubular wall to provide a polygon cross-section to the tubular member wherein each side of the polygon is reinforced by the rigid binder.

6. A device as defined in claim 5, wherein the total number of sides of the polygon falls within the range of eight to twelve.

7. A device as defined in claim 1, further comprising an end reinforcing member comprising a sleeve configured to slide snugly into an end opening of the tubular member, said sleeve including a radial flange extending outward from the sleeve to form a right angle which seats against an end face of the tubular member, said end reinforcing member being bonded at an internal, contacting face and at the end face of the tubular member to strengthen the tubular member at the end opening thereof.

8. A device as defined in claim 7, wherein the reinforcing member is fabricated of rigid metal material.

9. A device as defined in claim 7, wherein two tubular members are aligned along a common axis, each tubular member having the end reinforcing member bonded at the open end of the tubular member to which it is attached, said radial flanges of the reinforcing members being in abutting contact and including a sealing composition applied around a periphery of the radial flanges to develop an air-tight seal to prevent escape of air from within the tubular device.

10. A duct device for insulated delivery of temperature controlled air flow, said device comprising:
    an elongated, tubular member configured as a conduit for deliver of air, said tubular member having a tubular wall fabricated of non-load-bearing insulative material;
    said tubular wall having a plurality of longitudinal cuts forming open, elongate gaps extending substantially parallel with a central axis of the tubular wall and projecting into the insulative material from a surface of the tubular wall;
    a rigid binder solidified and bonded within the gap to the insulative material to provide structural stiffness both radially and axially to the duct device;
    an end reinforcing member comprising a sleeve configured to slide snugly into an end opening of the tubular member, said sleeve including a radial flange extending outward from the sleeve to form a right angle which seats against an end face of the tubular member, said end reinforcing member being bonded at an internal, contacting face and at the end face of the tubular member to strengthen the tubular member at the end opening thereof; and
    an interconnect sleeve having an outer wall configuration similar to an inner wall configuration of the reinforcing member and being sized to provide a secure frictional fit of the reinforcing members of two tubular devices around a single interconnect sleeve to enable intercoupling of two tubes along a common axis.

11. A duct device for insulated delivery of temperature controlled air flow, said device comprising:
    an elongated, tubular member configured as a conduit for deliver of air, said tubular member having a tubular wall fabricated of non-load-bearing insulative material;
    said insulative material including at least one continuous gap formed into the tubular wall and extending along the tubular member, said gap being filled with a rigid binder which bonds to the insulative material and is capable of reinforcing the structural strength of the tubular member;
    wherein the tubular member is formed from a sheet of insulative material which is joined at a junction of two opposing sides of the sheet of insulative material to form the tubular wall, said junction including a gap which is filled with the rigid binder to provide structural stiffness into the tubular wall.

12. A device as defined in claim 11, wherein the at least one continuous gap comprises a plurality of elongate gaps extending substantially parallel with a central axis of the tubular wall and projecting into the insulative material from a surface of the tubular wall, said gaps being filled with the rigid binder and bonded with the insulative material.

13. A device as defined in claim 12, wherein each gap is formed as an acute angle cut into an exterior surface of the tubular wall to provide a polygon cross-section to the tubular member wherein each side of the polygon is reinforced by the rigid binder.

14. A device as defined in claim 13, wherein the total number of sides of the polygon falls within the range of eight to twelve.

15. A device as defined in claim 11, wherein the insulative material comprises fiberglass.

16. A device as defined in claim 11, further comprising an end reinforcing member comprising a sleeve configured to slide snugly into an end opening of the tubular member, said sleeve including a radial flange extending outward from the sleeve to form a right angle which seats against an end face of the tubular member, said end reinforcing member being bonded at an internal, contacting face and at the end face of the tubular member to strengthen the tubular member at the end opening thereof.

17. A device as defined in claim 16, wherein the reinforcing member is fabricated of rigid metal material.

18. A duct device for insulated delivery of temperature controlled air flow, said device comprising:

an elongated, tubular member configured as a conduit for deliver of air, said tubular member having a tubular wall fabricated of non-load-bearing insulative material;

said insulative material including at least one continuous gap formed into the tubular wall and extending along the tubular member, said gap being filled with a rigid binder which bonds to the insulative material and is capable of reinforcing the structural strength of the tubular member;

wherein the at least one continuous gap comprises a helical configuration extending within the insulative material, said rigid binder forming a helical reinforcement to the duct device.

19. A duct device for insulated delivery of temperature controlled air flow, said device comprising:

an elongated, tubular member configured as a conduit for deliver of air, said tubular member having a tubular wall fabricated of non-load-bearing insulative material;

said insulative material including at least one continuous gap formed into the tubular wall and extending along the tubular member, said gap being filled with a rigid binder which bonds to the insulative material and is capable of reinforcing the structural strength of the tubular member;

an end reinforcing member comprising a sleeve configured to slide snugly into an end opening of the tubular member, said sleeve including a radial flange extending outward from the sleeve to form a right angle which seats against an end face of the tubular member, said end reinforcing member being bonded at an internal, contacting face and at the end face of the tubular member to strengthen the tubular member at the end opening thereof; and an interconnect sleeve having an outer wall configuration similar to an inner wall configuration of the reinforcing member and being sized to provide a secure frictional fit of the reinforcing members of two tubular devices around a single interconnect sleeve to enable intercoupling of two tubes along a common axis.

* * * * *